March 11, 1924.

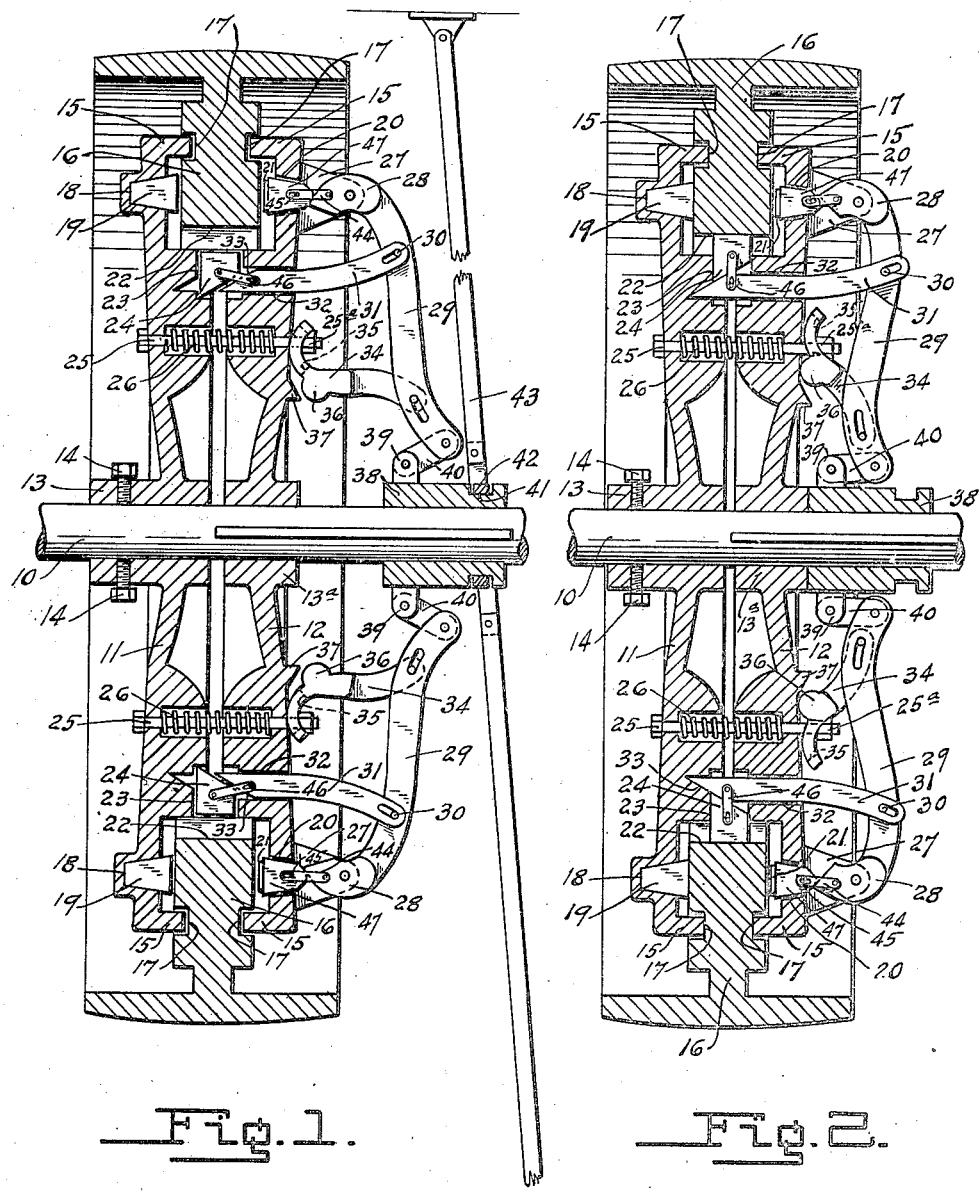

W. H. PETER 1,486,680

POWER TRANSMISSION MECHANISM

Filed Dec. 17, 1921

Inventor

William H. Peter

By Watson E. Coleman

Attorney

Patented Mar. 11, 1924.

1,486,680

UNITED STATES PATENT OFFICE.

WILLIAM H. PETER, OF CLEVELAND, OHIO.

POWER-TRANSMISSION MECHANISM.

Application filed December 17, 1921. Serial No. 523,022.

*To all whom it may concern:*

Be it known that I, WILLIAM H. PETER, a citizen of the United States, residing at Cleveland, in the county of Cuyahoga and State of Ohio, have invented certain new and useful Improvements in Power-Transmission Mechanisms, of which the following is a specification, reference being had to the accompanying drawings.

This invention relates to power transmission mechanisms, and particularly to that class of transmission mechanism where there is a rotary driving element, a rotary driven element concentric thereto, and means to create driving engagement between the driving and driven elements or operatively disengage said elements from each other.

The general object of this invention is to provide a construction of this character which is particularly adapted for causing a pulley to become either fast or loose, as may be desired, or a construction embodying a gear wheel or a sprocket wheel which may be either fast or loose with relation to the shaft upon which it is mounted, as desired.

Still another object is to provide a construction of this kind which affords an initial frictional engagement between the driving and driven elements, this engagement eventually becoming positive, thus eliminating shock and jerk when the driving and driven elements are drawn into or out of engagement with each other.

Another object is to provide a mechanism of this character embodying driving elements mounted upon a driving shaft for rotation therewith, a driven element disposed between the driving elements, means carried by the driving elements and shiftable into or out of frictional engagement with the driven element, and means acting successively to the friction means and carried by the driving elements whereby the driven element may be positively engaged and locked to the driving element.

A further object is to provide a construction of this character wherein a single lever is used for actuating the clutch between the driving and driven elements and which, upon a motion in one direction, first frictionally engages the driving elements with the driven element and then upon a further movement of the lever positively engages the two elements.

Other objects will appear in the course of the following description.

My invention is illustrated in the accompanying drawings, wherein:—

Figure 1 is a diametrical section through a transmission mechanism constructed in accordance with my invention and showing the driven element out of driving engagement with the driving element;

Figure 2 is a like view to Figure 1 but showing the driving and driven elements in operative engagement with each other;

Figure 3:
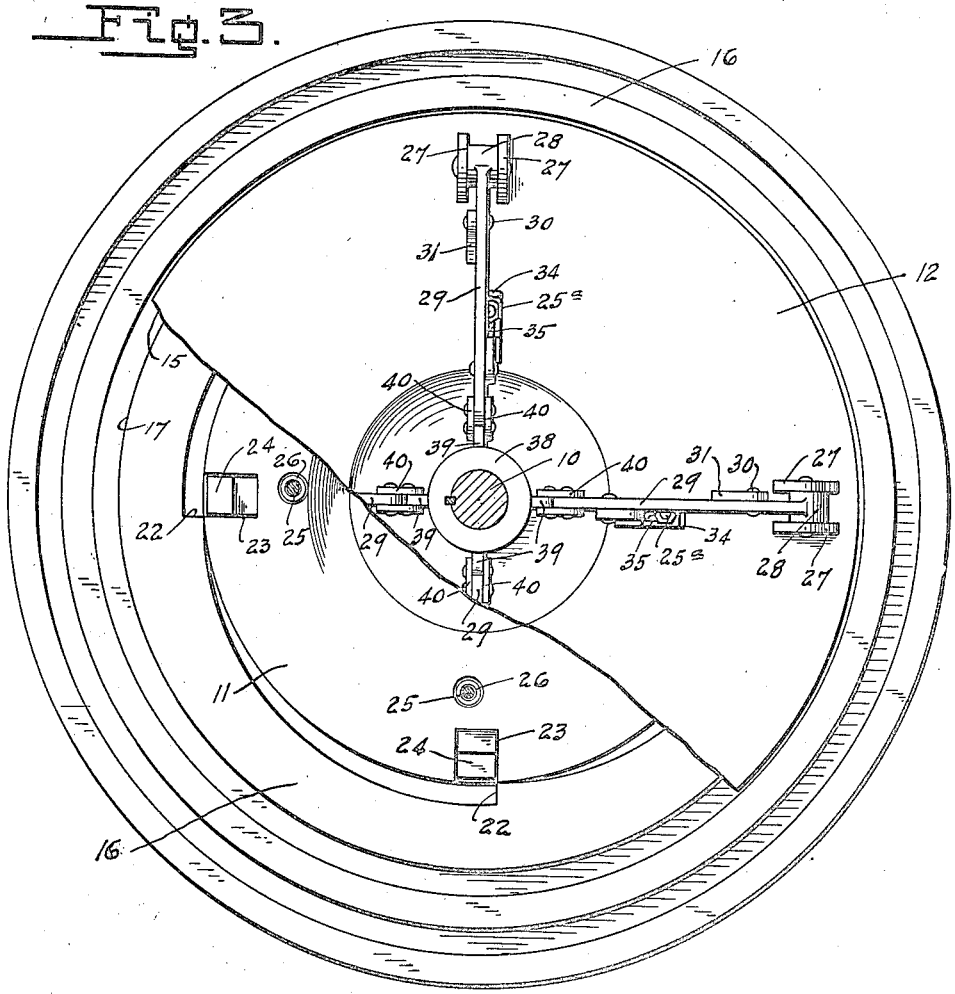
Figure 3 is a side elevation of the transmission mechanism, the shaft being in section and one of the plates being partly broken away.

Referring to these drawings, wherein I have illustrated one embodiment of my invention, 10 designates a driving shaft and 11 and 12 oppositely disposed, metallic disks mounted for rotation with the shaft. The disk 11 has a hub 13 which is held upon the shaft by means of set screws 14. This hub may be keyed to the shaft to rotate therewith, but the set screws 14 act to hold the hub and disk 11 from any longitudinal movement with reference to the shaft. The disk 12 is slidably mounted on the shaft and for this purpose is provided with a hub 13ª which is splined to the shaft but not connected thereto by means of set screws or other like devices. The peripheries of the two disks are inwardly flanged, as at 15. Disposed between the margins of the two disks is the annular driven element, designated generally 16, which may be either in the form of a pulley, a gear wheel, or a sprocket wheel. This driven element 16 is provided on each face with a groove 17 within which the flanges 15 project. The projection of the flanges may be relatively slight, and it is obvious that the outer face of this driven element 16 may have any desired width, either less than the distance between the outer faces of the disks 11 and 12 or greater than this distance.

The margin of the disk 11 is formed opposite the middle of the driven member 16 with a circumferentially extending recess 18 or with a circumferential series of recesses or pockets, and disposed in this annular recess or in the annular series of recesses or pockets is a wooden block or blocks 19, this block projecting inward beyond the inner face of the member 11. The disk 12 adjacent its margin is provided with a plurality of openings 20, and disposed in these openings are a series of friction blocks 21. These blocks and the block 19 may be made of wood, fiber or any other material which will secure sufficient friction. The blocks 21 are shiftable inward or outward and into or out of contact with the lateral face of the driven member 16. The inner face of the member 16 is formed with a plurality of ratchet recesses 22, illustrated as four in number, though a greater or less number may be used. The inner faces of the disks 11 and 12 are formed to provide a plurality of radially extending chambers 23, in which chambers are disposed locking pawls 24, and these pawls are projected and adapted to engage in the recesses 22 and lock the driven member positively to the driving members 11 and 12. Extending through the disks at uniformly spaced intervals are a plurality of bolts 25, shown as equal in number to the pawls 24, and surrounding each of these bolts and disposed between the plates or disks 11 and 12 is a coiled compression spring 26 which urges the disks away from each other. The means whereby the friction blocks 21 are shifted, whereby the locking pawls 24 are shifted, and whereby the disks 11 and 12 are urged toward each other is as follows:—

Mounted upon the disk 12 adjacent each opening 20 is a bracket 27 which carries at its outer end the cam 28. This cam bears against the outer end of the corresponding friction block 21. When the cam is turned to the position shown in Figure 2, the nose of each cam will engage the corresponding friction block 21 and force it inward into engagement with the lateral face of the driven member 16 so as to secure a frictional engagement between the disks and the driven member and frictionally clamp the driven member between the locking blocks 19 and the locking blocks 21. After this has occurred, it is necessary to shift the locking pawls into engagement with the driven member 16, and to this end each cam 28 is provided with an arm 29. This arm intermediate its length is provided with a laterally projecting pin 30 and coacting with the arm 29 is a wedge-like member having a shank 31, this shank being slotted for the passage of the pin 30. The wedge-like member passes through an opening 32 in the disk 12 and the inner end of this member is formed with an inclined face 33 which bears against the inclined face of the corresponding locking member 24 so that when this wedge is shifted inward the locking member 24 will be shifted outward and into engagement with the ratchet recesses 22 on the driven member 16.

In order to provide means whereby the disks 11 and 12 shall be forced toward each other against the action of the springs 26 when the blocks 21 are shifted inward and the locking pawls shifted outward, I pivotally connect to the end of each arm 29 a lever 34. The other end of this lever is forked, as at 35, to embrace the projecting end of the corresponding rod 25 inward of the head 25ᵃ of this rod. This lever is formed with a rounded protuberance or boss 36 constituting the fulcrum and the disk 12 is also formed with a corresponding protuberance or boss 37 against which the fulcrum bears and rocks. Thus it will be obvious that when the inner end of the arm 29 is shifted inward or toward the disk 12, the lever 34 will rock upon its fulcrum and the outer end of the lever will draw laterally on the bolt 25 and this action will shift the disk 12 inward.

In order to provide for the unitary oscillation of the arms 29, I provide a sliding sleeve 38 keyed to the shaft 10, this sleeve having radial ears 39 at one end which are connected by links 40 to the extremities of the arms 29. This sleeve 38 has the usual annular groove 41 in which is disposed the sectional collar 42 adapted to be engaged by the slotted lever 43 to which the collar is operatively connected. When this shipper lever 43 is shifted in one direction, the driving and driven elements will be operatively engaged with each other and when shifted in the opposite direction they will be operatively disengaged from each other.

In order to provide means for positively retracting the friction elements 21 in order to disengage the driven from the driving elements, an operative engagement is provided between each cam 28 and the corresponding friction block 21 and I have illustrated for this purpose the cam 28 as having pivoted to it the links 44 which are pivoted to blocks 47 by pins extending into slots 45. Thus as the arms 29 are forced inward from the position shown in Figure 1 to the position shown in Figure 2 each cam 28 is turned in one direction, and the face of the cam will urge the corresponding friction block inward, and as each cam moves beyond its middle position to the position shown in Figure 2, the links 44 of each cam will act to positively retract the corresponding friction block 21.

In order to provide for positively retracting the pawls, I pivotally connect to each pawl a link 46, this link having a pin and slot connection with the corresponding shank 31 of the wedging member which shifts the locking pawls outward. By this means the wedging member will move freely until it has secured wedging engagement with the pawl and will then urge the pawl outward, while upon a rearward movement of the wedging member the pawl will be positively retracted. Preferably, though not necessarily, the blocks 21 will be disposed within metallic casings 47, but I do not wish to be limited to this.

Figure 4:
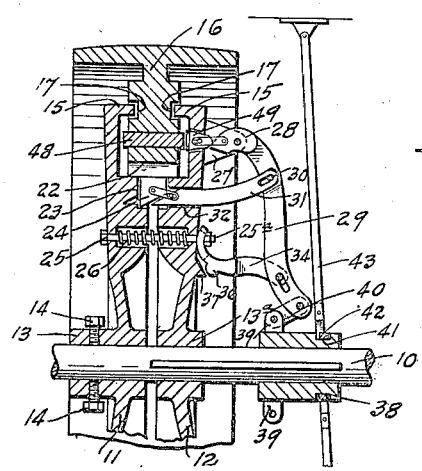
Figure 4 is a diametrical section with the parts in the position shown in Figure 1 but showing a modification of the mechanism.

In Figure 4, I show a modification of the mechanism, wherein the driven element 16 is provided with a series of wooden or composition friction blocks 48, which blocks project beyond the lateral faces of the driven member, and in this case the disks 11 and 12 do not carry wooden or composition friction blocks but the disk 11 has its metallic face adapted to bear against the end face of each block 48, while the disk 12 has metallic blocks 49 in place of the wooden or compositon blocks 21. Otherwise than this, the construction is exactly the same as heretofore described and the operation is precisely the same.

As before remarked, this mechanism may be used with a driven element having either a pulley face, that is a face like that of a band wheel, or the driven element may have sprockets upon its outer face supporting a sprocket wheel, or it may have gear teeth upon its outer face and constitute a gear wheel. In the first case, of course, belts will pass over the driven element, in the second case sprocket chains, and in the third case gear wheels will be engaged with the gear teeth on the driven element.

Assuming that the parts are in the position shown in Figure 1, then upon an inward movement of the sleeve 38 due to the swing of the lever 43, the levers 29 will move inward but because of the pin and slot connection at 30 this inward movement will not affect the link 31 but will move the cam 28 from the position shown in Figure 1 to a middle position where the point of the cam engages the rounded face of each block 21 and forces this block inward into frictional contact with the member 16. Upon a further movement inward of each lever 29, the pin 30 engages the end of the slot in the link 31 and forces this link inward and the beveled end of the link bearing against the beveled or wedge-shape face of the block 24 forces this block outward into position against the shoulder 22, thus positively locking the driven with the driving element. As this occurs the point of the cam 28 passes the projecting portion of the corresponding block 47 and the links 44 then act to retract these blocks 47. While the link 31 is moving the block 24 outward, the lever 34 is being operatel to force the two members 15 toward each other and into tight clamping engagement with the intermediate web 16. It will thus be seen that upon a further movement of the cams 28 past their middle position from the position shown in Figure 1 to that shown in Figure 2, the friction blocks 21 will be drawn outward or pressure on these blocks relieved, but at this time the positively acting pawls 24 or bolts will have positively engaged the driving elements 11 and 12 with the driven element 16, and that upon a reverse movement of the parts the positive lock formed by the pawls 24 is released and just as this positive locking action is released the frictional engagement is secured between the driving and driven elements, and that then upon a further movement of the levers 29 this frictional engagement is relieved. It is also to be noted that the plates 11 and 12 are forced toward each other immediately that the friction blocks 21 are forced inward.

It is obvious that various minor changes might be made in the details of construction and arrangement of parts and, therefore, while I have illustrated a particular effective form of my device, I do not wish to be limited to the details thereof except as specifically claimed.

I claim :—

1. A transmission mechanism of the character described comprising a driving element including two spaced disks mounted for common rotation, an annular driven element disposed between the spaced disks and supported thereby, manually operable controlling means, and means frictionally engaging the driven and driving elements upon the inward movement of the controlling means in one direction, and means positively engaging the driving and driven elements upon a further operation of the controlling means, a movement in the opposite direction of the controlling means first disengaging the positive engaging means and then disengaging the frictional engaging means.

2. A transmission mechanism of the character described comprising a driving element including two disks and a driven element disposed between the disks, one of said disks being held from longitudinal movement, a series of friction members mounted upon the other of said disks and shiftable into or out of frictional engagement with the driven element, a series of projectible locking members operatively supported by and operatively engaging said disks, the driven member having recesses on its inner face with which said locking members are adapted to engage, manually operable means, and means controlled by the manually operable means upon a movement of the manually operable means in one direction initially shifting said friction blocks into frictional engagement with the driven member and then acting to shift the locking members into positive engagement with the driven member and upon a reverse movement of the manually operable means acting to first retract the locking members from operative position and then retract the friction blocks.

3. A power transmission mechanism of the character described including a driving element comprising two spaced disks mounted for common rotation, one of said disks being held from longitudinal movement and the other movable toward or from the other disk, bolts extending through said disks and having heads, springs surrounding the bolts and disposed between the disks and urging the disks apart, a driven element disposed between the margins of the disks and operatively supported thereby in concentric relation to the disks and having recesses on its inner face, projectible locking members carried by the disks and rotating therewith, and manually operable means shiftable in one direction to draw the disks toward each other against the action of said springs and then project said locking members into engagement with the recesses in the driven member or in the other direction to retract said locking members and then permit the springs to urge the disks away from each other.

4. A transmission mechanism of the character described including a driving element comprising two rotatable spaced disks, springs urging said disks apart, a driven element disposed between the margins of the disks, projectible bolts carried upon the driving element, the driven element having recesses into which said bolts are projectible, friction blocks carried upon the margins of said disks, the friction blocks of one disk being movable toward or from the confronting face of the driven element, and manually operable means movable in one direction and operatively connected to said blocks, the bolts and the disks to first cause the projection of said friction blocks against the driven element and simultaneously draw the two disks toward each other against the action of said springs and then project the bolts into the recesses of the driven element to positively lock the driven element to the driving element, said manually operable means operating upon a movement in the reverse direction to first retract said locking members and then release said disks and retract the friction blocks.

5. A transmission mechanism of the character described including a driving element comprising spaced rotatable disks, one of said disks being held from longitudinal axial movement and the other being movable toward or from the first named disk, both of said disks having inwardly turned marginal flanges, an annular driven element disposed between said disks at the margins thereof and having an annular groove in which said flanges engage whereby the driven element is supported, the inner face of the driven element being formed with a plurality of radial recesses, projectible locking members carried by said driving element and adapted to be projected into the recesses in the driven element, a friction block carried upon the fixed disk and confronting one face of the driven element, a plurality of friction blocks carried upon the margin of the other disk and engageable with the confronting face of the driven element, bolts extending through the disks and having heads, springs between the disks and surrounding the bolts and urging the disks outward, a plurality of cams oscillatably mounted upon the axially movable disk and associated one with each friction block on the movable disk and engaging with said block, each of said cams having an inwardly directed arm, a sliding operating member operatively connected to the several arms, a series of levers pivoted to the extremities of the arms and fulcrumed upon the axially movable disk and engaging beneath the heads of the several bolts, and a plurality of wedging members equal in number to the locking members, operatively connected to said arms, and extending through the axially movable disk, the locking members and the wedging members having coacting inclined faces, the friction blocks being projected and the disks being drawn toward each other upon the movement of the arms in one direction and the locking members being projected upon the continued movement of said arms in the same direction, the wedging members and the locking members being operatively connected to each other to cause the retraction of the locking members upon the retraction of the wedging members, and the cams being operatively connected to the friction blocks to cause a retraction of said blocks upon a further movement of said arms.

6. In a transmission mechanism of the character described, a driving element consisting of spaced disks, a driven element disposed between the margins of said disks and supported by the disks, a shaft upon which the disks are fixed for rotation, friction blocks carried by the margin of one of said disks and confronting the lateral face of the driven element, and means for projecting and retracting said friction blocks comprising cams mounted upon said disk, the faces of the cams operatively engaging the friction blocks, the cams having radial, inwardly extending arms, a sleeve mounted upon the shaft for longitudinal movement and for rotation therewith, said sleeve being manually shiftable and being operatively connected to the arms.

7. In a transmission mechanism of the character described, a driving element comprising spaced disks, a driven element disposed between the disks and supported thereby, and means for locking the driving element to the driven element comprising a series of projectible locking members carried by the disks between the same, the driven element having recesses into which the locking members are adapted to project, inwardly extending radial arms pivotally mounted upon one of said disks, an axially movable manually controlled sleeve to which said arms are operatively connected whereby they may be shifted, and members pivoted to said arms extending through the last named disk, said members having operative engagement with the locking members to cause the projection or retraction of the locking members upon a movement of the arms.

8. In a transmission mechanism of the character described, a driving element comprising spaced disks, a driven element disposed between the disks and supported thereby, means for locking the driving element to the driven element comprising a series of projectible locking members carried by the disks between the same, the driven element having ratchet recesses upon its inner face, the locking members being bevelled upon their inner ends, inwardly extending radial arms pivotally mounted upon one of said disks, an axially movable manually controlled sleeve to which said arms are operatively connected whereby they may be shifted, and members pivoted to said arms extending through the last named disk, said members having operative engagement with the locking members to cause the projection or retraction of the locking members upon a movement of the arms.

9. In a transmission mechanism of the character described, a shaft, a driving element comprising two spaced disks mounted upon the shaft for rotation therewith, one of said disks having axial movement and the other being held from axial movement, bolts extending through the two disks and having heads, springs between the disks and surrounding the bolts and urging the disks outward with relation to each other, an annular driven element disposed between and supported by the margins of said disks, an axially movable manually operable controlling member mounted upon and rotatable with the shaft, and means for shifting the movable disk toward or from the fixed disk comprising radial arms pivoted upon the movable disk and extending toward the shaft, the ends of said arms being operatively connected to said manually controlled member, and means pivotally connected at their outer ends to said arms having rocking engagement with the said movable disk and having forked ends engaging between the adjacent heads of the bolts and the movable disk.

10. A transmission mechanism of the character described comprising spaced rotatable disks, an annular element disposed between the margins of said disks, the disks being formed with inwardly turned flanges and the member with grooves receiving said flanges whereby the member is supported, and manually controlled means for first frictionally engaging the disks with said member and then positively engaging the disks with said member.

11. A transmission mechanism of the character described comprising spaced rotatable disks, an annular element disposed between the margins of said disks, a plurality of projectible and retractible bolts disposed between the disks and engageable with the inner edge of the annular member, friction blocks carried by one of said disks and shiftable into or out of engagement with the annular member, and manually operable means movable in opposite directions and when moved in one direction acting to force the friction blocks inward into engagement with the annular member, then shift the bolts into engagement with the annular member, and then shift the friction blocks outward and acting upon a movement in the reverse direction to first retract the pawls and then project the friction blocks and upon a continued movement retract the friction blocks from their engagement with the annular member.

In testimony whereof I hereunto affix my signature.

WILLIAM H. PETER.